US006865843B1

(12) United States Patent
Jordan, Sr.

(10) Patent No.: US 6,865,843 B1
(45) Date of Patent: Mar. 15, 2005

(54) PORTABLE ELECTRICAL MOUSE TRAP

(76) Inventor: Charles Jordan, Sr., 1171 E. 38th St., Brooklyn, NY (US) 11210

( * ) Notice: Subject to any disclaimer, the term of this patent is extended or adjusted under 35 U.S.C. 154(b) by 0 days.

(21) Appl. No.: 10/691,773

(22) Filed: Oct. 23, 2003

(51) Int. Cl.[7] ................ A01M 23/00; A01M 23/14; A01M 23/16
(52) U.S. Cl. ............... 43/61; 43/58; 43/60; 43/64; 43/65; 43/73; 43/139
(58) Field of Search ............... 43/58, 60, 61, 43/64, 65, 73, 139; D22/119

(56) References Cited

U.S. PATENT DOCUMENTS

| | | | | |
|---|---|---|---|---|
| 4,062,142 A | * | 12/1977 | Marotti | 43/61 |
| 4,566,218 A | * | 1/1986 | Kurosawa et al. | 43/58 |
| 4,596,087 A | * | 6/1986 | Pratscher | 43/64 |
| 4,741,121 A | * | 5/1988 | Pratscher et al. | 43/58 |
| 4,835,900 A | * | 6/1989 | Shifflett | 43/58 |
| 4,965,959 A | * | 10/1990 | Gagne | 43/61 |
| 5,040,326 A | * | 8/1991 | Van Dijnsen et al. | 43/58 |
| 5,083,704 A | * | 1/1992 | Rounthwaite | 232/43.2 |
| 5,185,953 A | * | 2/1993 | Gross | 43/58 |
| 5,477,635 A | | 12/1995 | Orsano | 43/81 |
| 5,926,997 A | | 7/1999 | Wilcox | 43/60 |
| 6,016,623 A | | 1/2000 | Celestine | 43/61 |
| 6,088,948 A | * | 7/2000 | Rønnau | 43/72 |
| 6,202,340 B1 | | 3/2001 | Nieves | 43/61 |
| D464,393 S | * | 10/2002 | Jordan | D22/119 |

* cited by examiner

*Primary Examiner*—Kurt Rowan
(74) *Attorney, Agent, or Firm*—Goldstein Law Offices, P.C.

(57) ABSTRACT

A portable electrical mouse trap that has a housing in the shape of a cat to which a handle is attached. An interior cavity of the mouse trap contains a primary motion sensor near its entrance, a retractable primary gate, a reservoir of a fragrance that smells like fresh cheese, a secondary motion sensor near an entrance to the collection chamber, a retractable secondary gate and a vacuum source. The primary motion sensor and secondary motion sensor detect the presence of a mouse inside the interior cavity. The primary gate automatically opens when activated by the primary motion sensor and the secondary gate automatically opens when activated by the secondary motion sensor. A vacuum tube connects the vacuum source and collection chamber. The vacuum source sucks the mouse fully into the collection chamber and thereby suffocates it. A speaker informs a user when the collection chamber is full.

5 Claims, 4 Drawing Sheets

PORTABLE ELECTRICAL MOUSE TRAP

BACKGROUND OF THE INVENTION

1. Field of the Invention

The invention generally relates to a mouse trap, and in particular it relates to a portable electrical mouse trap in the shape of a cat.

2. Description of the Related Art

Mice make unwanted intrusions into the lives of people from all walks of life in this country. They are almost always pesky and unpleasant visitors when they enter a person's residence. When mice sneak into living quarters, homeowners and tenants usually regard them with contempt since they generally contribute nothing positive to their adapted surroundings. To the contrary, mice can cause considerable damage to the structure of a dwelling and can render an entire area unlivable if they are allowed to reproduce for a significant period of time. Furthermore, mice often carry insects and other undesirable animals with them and introduce these organic species into homes. Mice also leave droppings wherever they travel, including inside homes that are extremely unsanitary if they are not immediately detected and removed. Many farmers and individuals who maintain gardens also harbor a special loathing of mice since they often destroy or eat valuable crops and plants. Food store and restaurant owners must cope with an additional challenge of protecting their inventories from mice in order to comply with local and state health code requirements and maintain their reputations for cleanliness in the community. Therefore, capturing and cleanly killing mice has become an extremely important, if not overriding, objective for millions of Americans.

However, most conventional means of killing mice have significant drawbacks and therefore are of limited utility. Mechanical mousetraps are generally difficult to properly set since their latching mechanisms are excessively sensitive. Also, such devices are often ineffective since knowing mice can devour the bait directly after falsely triggering the trap or indirectly without triggering the trap at all. Moreover, even when traditional mousetraps function properly, a user must clean up a significant mess and expend considerable time properly disposing of the dead mouse and preparing the surrounding area for normal use. Audible varmint-repellant devices do not kill mice at all. Instead, they scare mice away from certain areas in a home without preventing them from entering other areas in the home, such as bedrooms and dining rooms. Audible devices are therefore only operative in the immediate vicinity of where mice have been observed and not throughout the entirety of a building. Consequently, there is a pressing need for an electrical mouse trap that is capable of capturing and cleanly killing mice in all regions of the structure in which it is situated.

U.S. Pat. No. Des. 155,486 to Cook ("Cook '486") teaches an ornamental design for an animal trap. However, a mouse trap having the design of Cook '486 would be highly inefficient since it would allow mice to exit alive and unharmed.

U.S. Pat. No. Des. 155,487 to Cook ("Cook '487") teaches an ornamental design for an animal trap. However, a mouse trap having the design of Cook '487 would also be highly inefficient since it would allow mice to exit alive and unharmed.

U.S. Pat. No. 4,641,456 to Boharski ("Boharski") discloses a mouse trap. However, the mouse trap of Boharski holds mice alive and does not kill them.

U.S. Pat. No. 5,477,635 to Orsano ("Orsano") teaches a signaling apparatus that indicates when a disposable animal trap has been triggered. However, Orsano does not provide a mouse trap.

U.S. Pat. No. 5,926,997 to Wilcox ("Wilcox") discloses a stationary vacuum trap for vermin. However, the vacuum trap of Wilcox is not portable.

U.S. Pat. No. 6,016,623 to Celestine ("Celestine") teaches a rodent trap. However, the rodent trap of Celestine holds mice alive and does not kill them.

U.S. Pat. No. 6,202,340 B1 to Nieves ("Nieves") discloses an electronically actuated animal trap. However, the animal trap of Nieves holds mice alive and does not kill them.

While these devices may be suitable for the particular purposes employed, or for general use, they would not be as suitable for the purposes of the present invention as disclosed hereafter.

SUMMARY OF THE INVENTION

It is an object of the invention to provide a mouse trap that can easily be transported from one location to another. Accordingly, a handle is attached to the exterior surface of the mouse trap.

It is another object of the invention to provide a mouse trap that prevent captured mice from escaping. Accordingly, a mouth automatically closes after each mouse enters an interior cavity of the mouse trap.

It is a further object of the invention to provide a mouse trap that has means for sensing when a mouse has entered it. Accordingly, the mouse trap contains primary and secondary motion sensors that are capable of detecting the presence of a mouse within the interior cavity.

It is a further object of the invention to provide a mouse trap that confines a captured mouse to the interior cavity upon entering it. Accordingly, a retractable primary gate that automatically opens when activated by the primary motion sensor is located near the entrance to the interior cavity.

It is a further object of the invention to provide a mouse trap that has a holding area for dead mice. Accordingly, a collection chamber is located within the interior cavity of the mouse trap.

It is a further object of the invention to provide a mouse trap that induces a captured mouse to enter the collection chamber. Accordingly, the mouse trap contains a reservoir of a fragrance that smells like fresh cheese and automatically dispenses within the interior cavity when the primary gate closes.

It is a further object of the invention to provide a mouse trap that confines a captured mouse to the collection chamber upon entering it. Accordingly, a retractable secondary gate that automatically opens when activated by the secondary motion sensor is located near the entrance to the collection chamber.

It is a further object of the invention to notify the user when a mouse has been captured. Accordingly, once a mouse has been confined in the collection chamber, the eyes illuminate. A speaker indicates when the collection chamber is full.

The invention is a portable electrical mouse trap that has a housing in the shape of a cat to which a handle is attached. An interior cavity of the mouse trap contains a primary motion sensor near its entrance, a retractable primary gate, a reservoir of a fragrance that smells like fresh cheese, a secondary motion sensor near an entrance to the collection chamber, a retractable secondary gate and a vacuum source. The primary motion sensor and secondary motion sensor detect the presence of a mouse inside the interior cavity. The primary gate automatically opens when activated by the primary motion sensor and the secondary gate automatically opens when activated by the secondary motion sensor. A vacuum tube connects the vacuum source and collection chamber. The vacuum source sucks the mouse fully into the collection chamber and thereby suffocates it. A speaker informs a user when the collection chamber is full.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
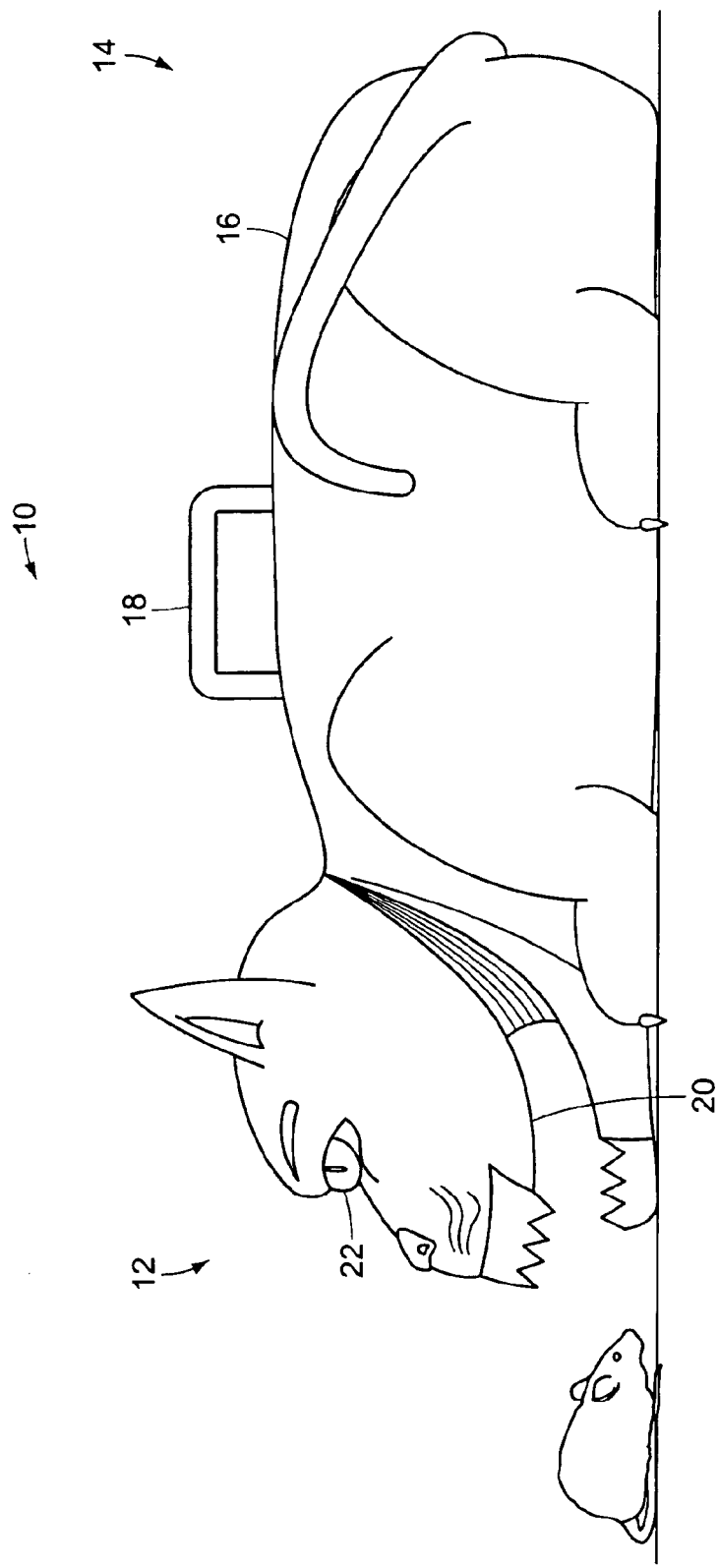
FIG. 1 is a side elevational view of the portable electrical mouse trap according to the present invention with a mouse approaching the mouth.

FIG. 1 presents a side elevational view of a portable electrical mouse trap 10 according to the present invention. The mouse trap 10 has the shape of a cat and is encompassed by a housing 16, which can be conceptually divided into a head section 12 and a tail section 14. An elongated handle 18 is mounted onto the housing 16. The handle 18 preferably contains a gripping aide on its interior surface so that a user can easily transport the mouse trap 10 from one location to another. The head section 12 includes a mouth 20 and a pair of eyes 22. An unsuspecting mouse approaches the mouth 20, which is in an open position. The mouse trap 10 can be manufactured in different sizes and from various materials depending upon the environment in which a user desires to employ the mouse trap 10. If mice are spotted in a tight region such as beneath a stove or in a corner of a closet, the housing 16 will be relatively compact. However, if the region of interest is comparatively large, such as a basement or an outdoor garden, a longer and wider housing 16 may be effectively utilized. Also, if the user wishes to deploy the mouse trap 10 in an indoor environment such as a home or a place of business, the housing 16 may be made of a standard metallic alloy. On the other hand, the housing 16 may be constructed from one of many known durable and non-corrosive polymeric substances for outdoor use.

Figure 2:
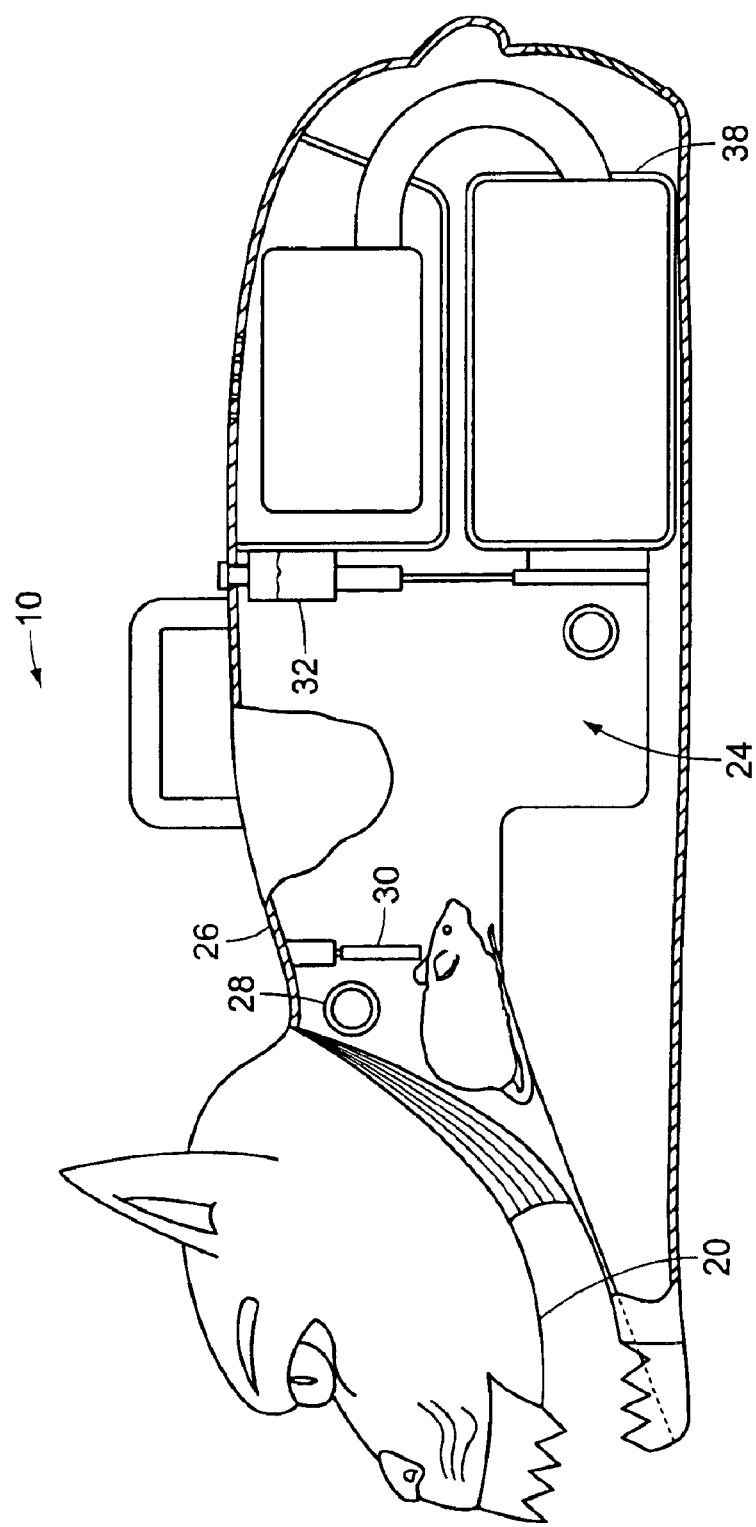
FIG. 2 is a side elevational view of the mouse trap with the mouse inside the mouth and approaching the interior cavity.

FIG. 2 depicts the mouse trap 10 with the mouse inside the mouth 20 and approaching an interior cavity 24. The mouse is located at an entrance 26 to the interior cavity 24 and is passing a primary motion sensor 28. The primary motion sensor 28 detects the presence of the mouse by electronically measuring the difference in movement at the entrance 26 that results from the activities of the mouse in the immediate area. Upon ascertaining this differential, the primary motion sensor 28 activates a primary gate 30, which then opens. The primary gate 30 automatically partially retracts in an upward direction so that the mouse may scurry below its lower surface into the interior cavity 24. After a few seconds, the primary gate 30 closes. A reservoir 32 of a cheese-scented fragrance automatically dispenses within the interior cavity 24 when the primary gate 30 closes. The fragrance keenly attracts the mouse and lures it into a collection chamber 38.

Figure 3:
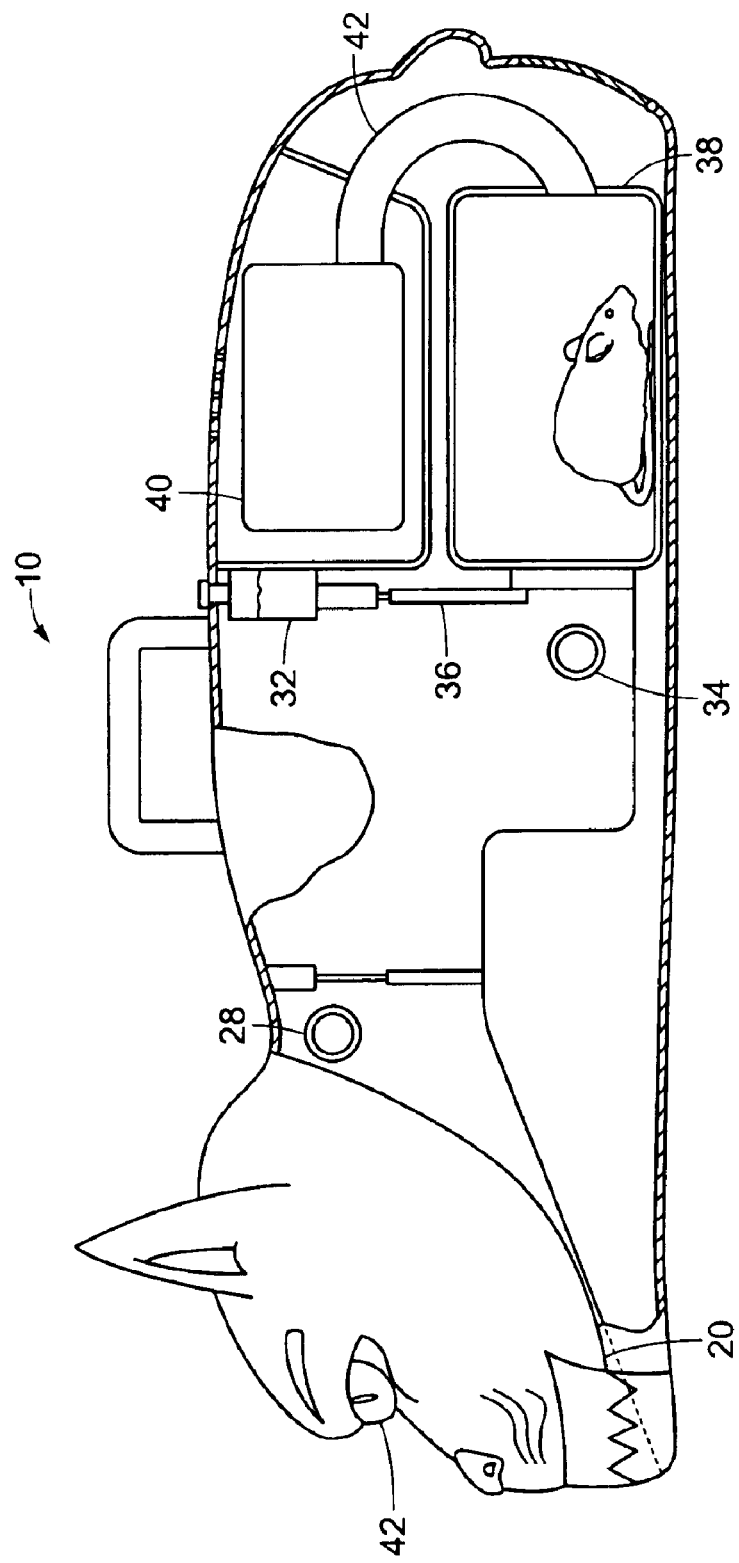
FIG. 3 is a side elevational view of the mouse trap with the mouse inside the collection chamber.

FIG. 3 illustrates the mouse trap 10 with the mouse inside the collection chamber 38. The mouse has entered the collection chamber 38 through a secondary gate 36, which automatically partially retracted in an upward direction when activated by a secondary motion sensor 34. The primary motion sensor 28 automatically closed the mouth 20 when the mouse entered the collection chamber 38. It should be noted that the secondary motion sensor 34 operates according to the same mechanical and electrical principles as the primary motion sensor 28. After a few seconds, the secondary gate 36 closes. A vacuum source 40 is in communication with the collection chamber 38 through a vacuum tube 42. The vacuum source 40 has partially sucked the mouse into the collection chamber 38 so that it cannot escape before the secondary gate 36 closes. The eyes 42 of the mouse trap 10 automatically illuminate. The vacuum source 40 and the vacuum tube 42 can be of any known type and configuration. In addition, the vacuum source 40 need only have a minimal strength since the mouse is a relatively small and weak animal and the air pressure inside the collection chamber is quite low.

Figure 4:
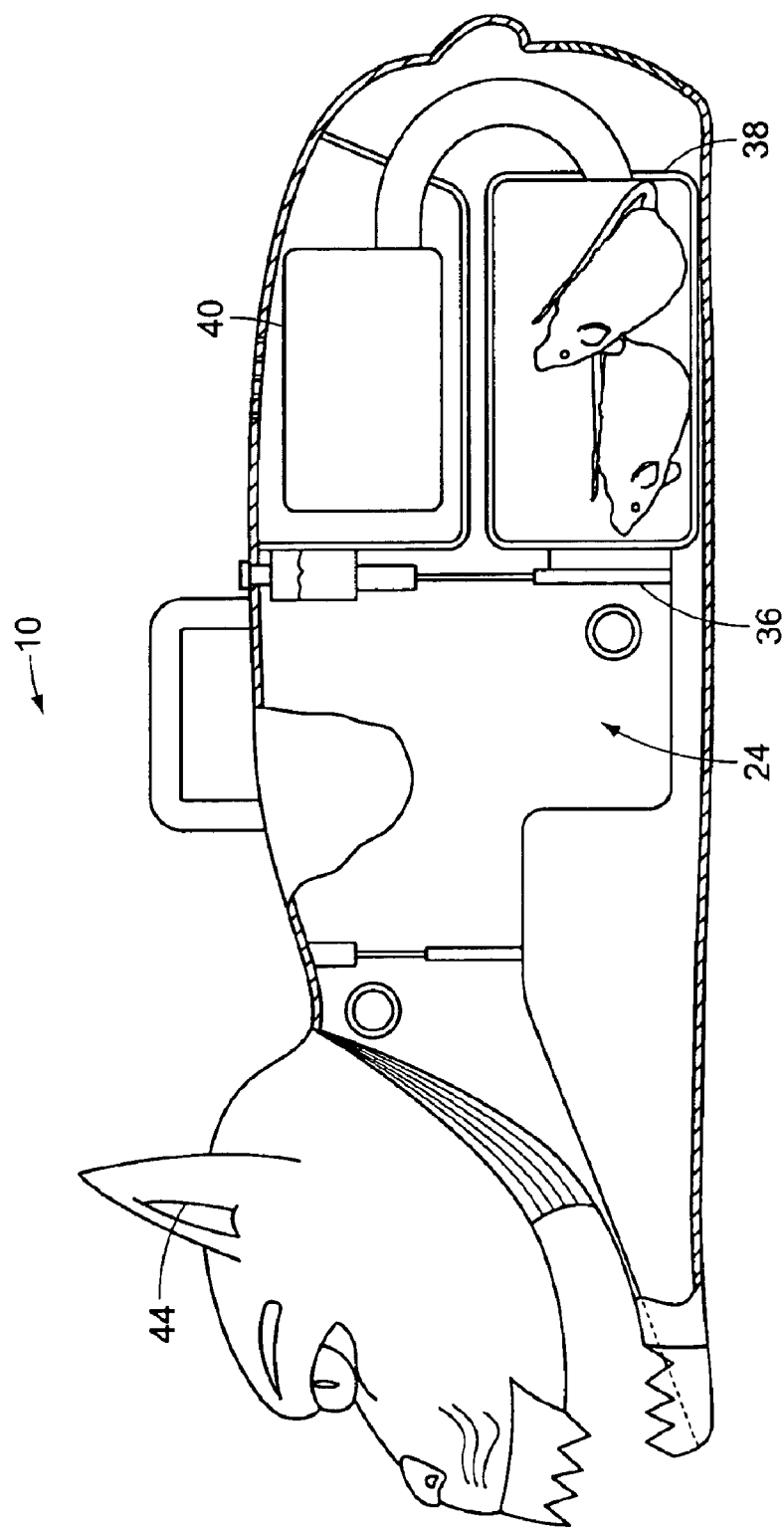
FIG. 4 is a side elevational view of the mouse trap with two dead mice inside the collection chamber.

FIG. 4 shows the mouse trap 10 with two dead mice inside the collection chamber 38. The mice passed through the secondary gate 36 and were sucked fully into the collection chamber 38 by the vacuum source 40. Both mice died from suffocation shortly after entering the collection chamber 38. When the collection chamber 38 is full of dead mice, a loud purring noise emanates from a speaker 44 in the interior cavity 24. This noise notifies a user that he must empty the collection chamber 38 and replace it in the interior cavity 24. Additionally, a disposable bag may be positioned within the collection chamber 38, wherein the mice sucked into said chamber 38 are stored in the bag until such time as the bag is removed therefrom for disposal. The use of the disposable bag eliminates the need of the user to come into direct contact with the dead mice.

In conclusion, herein is presented a portable electrical mouse trap. The invention is illustrated by example in the drawing figures, and throughout the written description. It should be understood that numerous variations are possible, while adhering to the inventive concept. Such variations are contemplated as being a part of the present invention.

What is claimed is:

1. A portable electrical mouse trap for capturing and killing a mouse, comprising:

a housing in the shape of a cat having a head with a pair of eyes and a mouth defining an interior cavity, the mouth forming an entrance to the interior cavity;

a primary motion sensor near the entrance to the interior cavity for selectively closing the mouth;

a retractable primary gate in electrical communication with the primary motion sensor;

a collection chamber within the interior cavity for holding a plurality of captured mice;

a reservoir of a mouse-attracting fragrance that automatically dispenses within the interior cavity;

a secondary motion sensor near an entrance to the collection chamber;

a retractable secondary gate in electrical communication with the secondary motion sensor; and a vacuum source in communication with the collection chamber, wherein the primary motion sensor and secondary motion sensor detect the presence of a mouse inside the interior cavity and activate the vacuum source to draw the mouse into the collection chamber and close the secondary gate.

2. The portable electrical mouse trap as recited in claim 1, wherein the primary motion sensor closes the mouth when the mouse enters the interior cavity and the mouth opens when the mouse enters the collection chamber.

3. The portable electrical mouse trap as recited in claim 2, wherein the eyes automatically illuminate when the mouse enters the collection chamber.

4. The portable electrical mouse trap as recited in claim 3, wherein the vacuum source sucks the mouse fully into the collection chamber where it suffocates.

5. The portable electrical mouse trap as recited in claim 4, wherein the interior cavity further contains a speaker from which a purring noise emanates when the collection chamber is full of dead mice.

* * * * *